Figure 1:
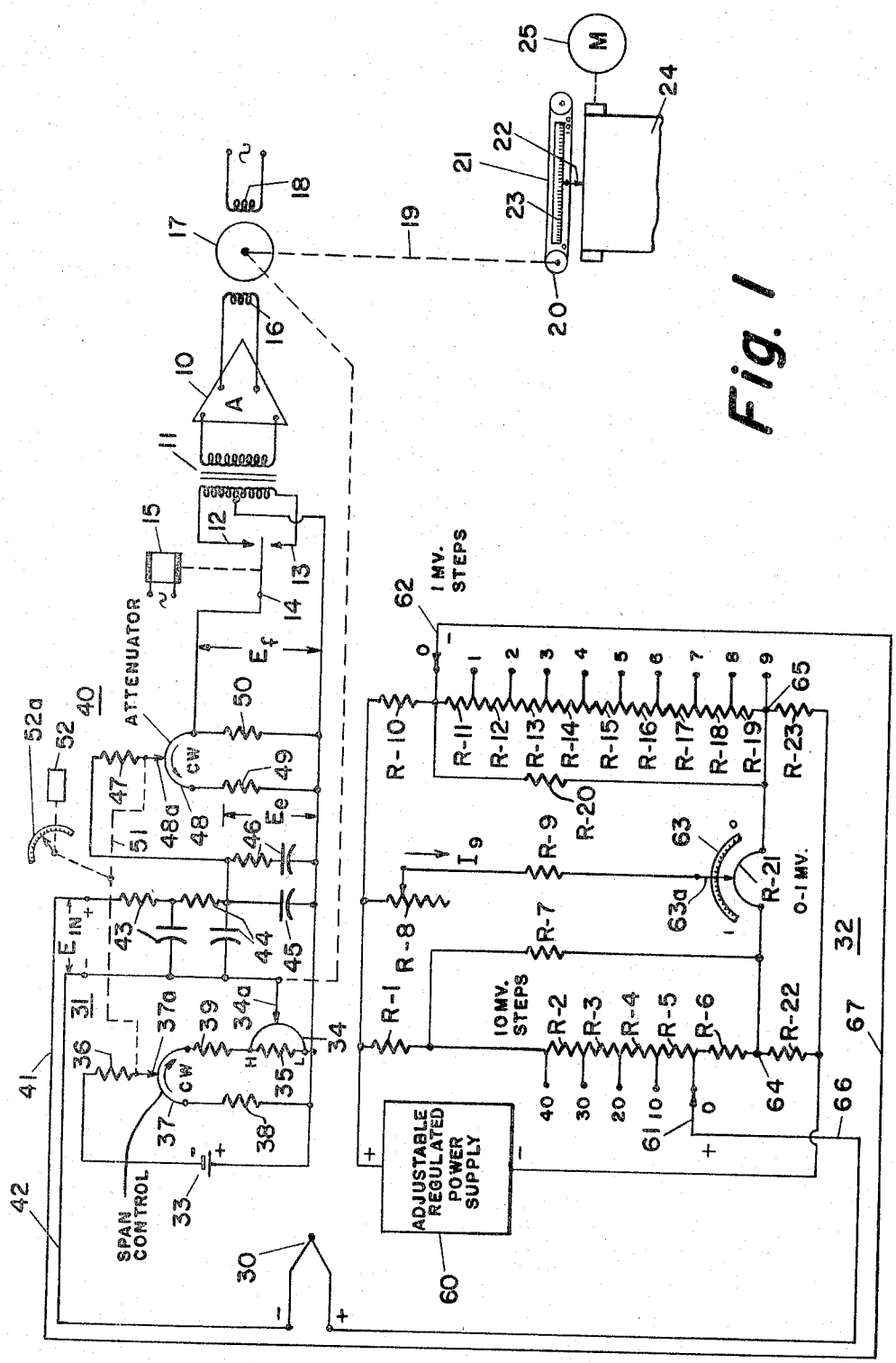

May 2, 1967
C. E. MILLER
NULL TYPE MULTIRANGE MEASURING SYSTEM WHICH MAINTAINS CONSTANT SENSITIVITY THROUGHOUT THE SEVERAL RANGES

Filed July 2, 1964

United States Patent Office 3,317,833
Patented May 2, 1967

3,317,833
NULL TYPE MULTIRANGE MEASURING SYSTEM WHICH MAINTAINS CONSTANT SENSITIVITY THROUGHOUT THE SEVERAL RANGES
Charles E. Miller, Glenside, Pa., assignor to Leeds & Northrup Company, a corporation of Pennsylvania
Filed July 2, 1964, Ser. No. 380,093
6 Claims. (Cl. 324—99)

This invention relates to measuring systems of the type in which there are provided arrangements for adjusting both the zero and the span, and has for an object the provision of circuits for said adjustments which are simple, reliable, and less subject to factors which have heretofore adversely affected prior art arrangements.

Measuring systems suited to the measurement of unknown conditions which may vary over a wide range and at other times over a narrow range require provision for the adjustment of the measuring range or span of the measuring system or instrument. Where there be added the additional factor of high-speed measurement, as for example, the driving of an exhibiting means, such as a pointer or pen, or both, from one end to the other of a relatively long scale in a quarter of a second or less, additional requirements are imposed on the associated circuitry. This is particularly so where the measuring system may form a part of an arrangement for maintaining within a fraction of a degree a temperature which may be upwardly of 1200° F. For such an application, there must be provided high precision, high sensitivity, zero suppression and the absence of thermal voltages and variable contact resistances which may otherwise be present in the range-changing and zero-suppression components.

In addition to providing a system satisfactorily meeting the foregoing strict requirements, the present invention also includes a system which with a change of the span or range of measurement concurrently adjusts the gain of the amplifier forming a part of the detector so that for all settings of the span-control, the amplifier sensitivity will be substantially constant.

In carrying out the invention in one form thereof, a span-controlling slidewire having equal-valued resistors in series with each leg thereof, is associated with a measuring slidewire which comprises one of the equal-valued resistors. There is provided an attenuating slidewire having equal-valued resistors in each leg thereof, one of said resistors forming the input resistor to the detector-amplifier.

Further, in accordance with the invention, there is provided a network for inserting the needed voltage into the measuring circuit for desired zero-suppression. This network is characterized in that its switch contacts carry no currents of consequential magnitude. Single-pole switches are utilized in contrast with double-pole current-carrying switches heretofore deemed necessary. Thermal emfs are minimized and tend to cancel out by taking the output from the poles of two switches of similar construction and of similar materials. More particularly, the voltage range is provided by two series or decades of resistors, each having the usual discrete steps together with an associated slidewire providing for vernier adjustment of the voltage derived from the low-voltage decade or series of resistors, this vernier slidewire being characterized by a relatively high resistance and by relatively low-resistance shunts to minimize the effect of the high-resistance slidewire on the output resistance of the zero-suppressing system.

Figure 2:
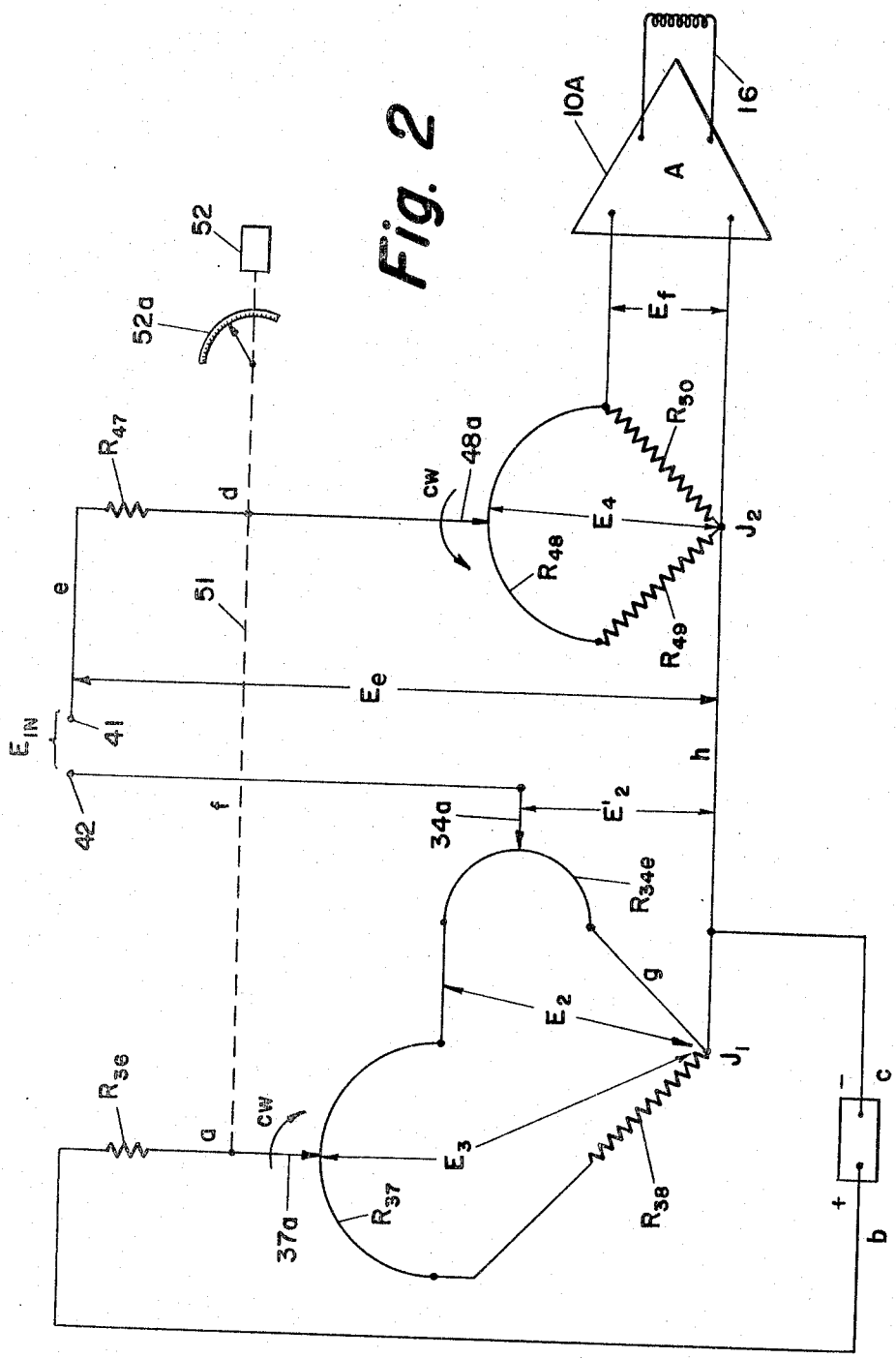

For further objects and advantages of the invention, and for a detailed discussion of a preferred embodiment, reference is to be had to the following detailed description taken in conjunction with the accompanying drawing in which:

FIG. 1 diagrammatically illustrates a system embodying the invention; and
FIG. 2 is an electrical circuit, the equivalent of a part of the span-adjusting part of the circuit of FIG. 1.

Referring to FIG. 1, a detector-amplifier 10 has an input transformer 11 with the ends of the primary winding connected respectively to stationary contacts 12 and 13 of a chopper 14 driven by an operating coil 15 from a suitable source of alternating current to convert an applied voltage $E_f$ to alternating current as applied to the detector-amplifier 10. The amplifier applies to a control winding 16 of a motor 17 alternating current which causes the motor to rotate in a forward or reverse direction depending upon the relative phase of the energizing current compared with that supplied to a motor power winding 18 energized from the same source which supplies the coil 15. Thus, the motor 17 serves to drive through the mechanical connection 19, the pulley 20 and belt 21 to position a pen index 22 to adjust its pointer relative to scale 23 and move its pen or marker across a calibrated chart 24 driven at constant speed by a motor 25.

The present system is adapted to the measurement of a wide range of unknown voltage inputs generally referred to as measured variables. As exemplary, there has been illustrated a thermocouple 30 which it will be understood may be utilized for the measurement of temperatures which may run from relatively low temperatures to those as high as 2,000° F. The requirements of the measuring system with temperatures in the range of a few hundred degrees F. as compared with those above 1,000° F. or more widely differ. Moreover, where greater precision is desired, the scale 23 can best represent a small change in the measured variable; for example, where the thermocouple is subjected to a temperature of 1200° F., a full-scale variation may be representative of but a 50° range. To achieve this objective, there will be utilized both a range-changing system 31 and a zero-suppression system 32.

The span or range-changing system includes a source 33—for simplicity shown as a battery—for supplying current to a measuring slidewire 34 whose contact 34a is adjusted by the motor 17 to balance the input voltage from thermocouple 30. The measuring slidewire 34 has a resistor 35 in shunt therewith to predetermine the effective resistance value of the measuring slidewire. It can be seen at once that the circuit from the battery 33 includes a series resistor 36 connected to a contact 37a of a current-adjusting slidewire 37. One of the leg-connections of slidewire 37 includes a resistor 38, and the other leg-connection of the slidewire assembly 34—35 includes a resistor 39. It will be noted that as the contact 37a is moved in a clockwise direction towards the measuring slidewire, the current through that slidewire will be increased; and as it is moved in a counterclockwise direction, it will be decreased. Thus, the incremental adjustment of contact 34a of the measuring slidewire 34 for the production of a given balancing voltage will depend upon the setting of the span-controlling slidewire contact 37a.

Before describing in detail the operation of the zero-selecting circuit 32, it will be helpful to continue the analysis of the span-controlling system and its cooperative relationship with an attenuating circuit 40 provided as a gain control for the detector-amplifier 10. As shown, there is applied to input conductors 41 and 42 the input voltage $E_{IN}$, this input circuit including conventional filter sections 43 and 44. The difference voltage between that derived from the measuring slidewire 34 and the input voltage is applied to a capacitor 45 which in conjunction with a second filter section 46 forms a phase-correcting network. Its purpose, as understood by those skilled in the art, is to introduce a correction by the capacitor 45 and the section 46 for any phase-distortion that may have occurred due to the passage of the measuring slidewire voltage through the filter sections 43 and 44.

The output voltage from filter section 46 is applied to a resistor 47 in series with the adjustable contact 48a of an attenuating slidewire 48 which is provided in each of its leg connections with equal-valued resistors 49 and 50. It is to be noted that the output from the attenuating network 40 is taken from the resistor 50 in one of the leg connections of slidewire 48. Thus, the output voltage $E_f$ is applied, as described above, to the detector-amplifier which then operates to adjust the contact 34a of measuring slidewire 34 to decrease this output voltage toward and to zero as a limit.

It is to be understtood that where reference has been made to slidewires and to their adjustable contacts, either the contatct or the resistance wire comprising the slidewire may be rotated with reference to the other, the adjustability of the contact having been shown for simplicity of description and illustration.

It is further to be noted that the term "slidewire" is one used by those skilled in the art to refer to variable resistors of a particular well-known type.

Returning now to the attenuator slidewire 48, it is to be noted that as the contact 48a is moved in a clockwise direction toward its leg connection 49, the output voltage $E_f$ will be decreased; and as it is moved toward the output resistor 50, the output across that resistor will be increased. The contacts 37a and 48a are ganged together as by a mechanical connection 51, which through a knob 52 are concurrently adjusted, the directions of adjustment being indicated by the arrows labeled CW, indicating the direction of movement of the contacts 37a and 48a for clockwise rotation of knob 52.

The purpose of the span or range-controlling system 31 and the attenuating circuit 40 is to provide substantially constant gain for the detector-amplifier 10 for all positions of the contact 37a. That this is accomplished and how it is accomplished will now be set forth.

Referring now to FIG. 2, which is the electrical equivalent of the circuit just described, the resistor $R_{36}$ is representative of all of the resistance in the branch a, b, c, that is, representative of the resistance looking outward from the slidewire contact 37a and from the juncture $J_1$ of resistor 38 with the end of slidewire $R_{34e}$. The resistor $R_{47}$ is representative of all of the resistance in the series branch d, e, f, g, h, that is, the resistance looking outward from the contact 48a of slidewire 48 and from the juncture $J_2$ of resistors $R_{49}$ and $R_{50}$. Slidewire resistors $R_{37}$ and $R_{48}$ have linear tapers. For a clockwise rotation of knob 52, the slidewire resistors $R_{37}$ and $R_{48}$ are adjusted in the directions indicated by the arrows and labeled "CW" applied to the respective contacts 37a and 48a. In the drawing, the contacts are indicated as movable, it being understood that in practice either the contacts or the slidewires themselves may be rotated to make the same adjustments in the circuit as with the illustrated movement of the contacts.

The resistors $R_{38}$ and $R_{34e}$ respectively represent the resistances in the leg branches of slidewire $R_{37}$. By making resistor $R_{38}$ equal to slidewire resistor $R_{34e}$, it will be seen that the voltage $E_3$ remains the same, with the slidewire contact 37a first in its extreme clockwise position and then in its extreme counterclockwise position. This, of course, follows since the current through the slidewire resistor $R_{34e}$ for the extreme clockwise position will have a given value which will be equal to the current through the resistor $R_{38}$ with the contact 37a in its extreme counterclockwise position. Accordingly, $$E_{3(CW)} = E_{3(CCW)} \qquad (1)$$

It is apparent that in the full clockwise position, $$E_{2(CW)} = E_{3(CW)} \qquad (2)$$

For the extreme counterclockwise position of contact 37a, the voltage $E_2$ will be reduced by a fraction dependent upon the values of resistors $R_{34e}$ and $R_{37}$. More specifically, $$E_{2(CCW)} = E_{3(CCW)} \times \frac{R_{34e}}{R_{34e} + R_{37}} \qquad (3)$$

There may now be written the ratio of the values of the voltage $E_2$ for the two extreme positions of contact 37a:

$$\frac{E_{2(CW)}}{E_{2(CCW)}} = \frac{E_{3(CW)}}{E_{3(CCW)} \times \frac{R_{34e}}{R_{34e} + R_{37}}} \qquad (4)$$

Since $E_3$ for the clockwise and the counterclockwise positions have already been established as equal, they cancel out in the equation, and hence, $$\frac{E_{2(CW)}}{E_{2(CCW)}} = 1 + \frac{R_{37}}{R_{34e}} = 1 + P \qquad (5)$$

where $$P = \frac{R_{37}}{R_{34e}}$$

It is clear by inspection of FIG. 2 that the fractional voltage $E'_2$ derived from the slidewire will for any given position of contact 34a be proportional to voltage $E_2$, and hence for a given value of $E_{IN}$, the error voltage $E_e$ applied to the attenuator for the two extreme positions of contact 37a may be correctly and explicitly expressed by Equation 5 above.

Similar to the analysis made above, if there now be considered the voltage $E_4$ applied between the contact 48a of attenuating slidewire $R_{48}$ and the juncture $J_2$ between resistors $R_{49}$ and $R_{50}$, there may be developed the applicable equations with the contact 48a in its extreme clockwise position and in its extreme counterclockwise position. Since resistors $R_{49}$ and $R_{50}$ are made equal, the voltage $E_4$ will not change with contact 48a in its two extreme positions. Mathematically, $$E_{4(CW)} = E_{4(CCW)} \qquad (6)$$

With contact 48a in the extreme clockwise position, $E_f$ will be decreased to a fractional value dependent upon the relative values of resistors $R_{48}$ and $R_{50}$. More particularly, $$E_{f(CW)} = E_{4(CW)} \times \frac{R_{50}}{R_{50} + R_{48}} \qquad (7)$$

For the extreme counterclockwise position, $E_f$ will be equal to $E_4$, that is, $$E_{f(CCW)} = E_{4(CCW)} \qquad (8)$$

Since $E_4$ counterclockwise and $E_4$ clockwise are equal, they cancel out in writing down the ratio of Equations 7 and 8, and there is then obtained the following expression:

$$\frac{E_{f(CW)}}{E_{f(CCW)}} = \frac{E_{4(CW)}}{E_{4(CCW)}} \times \frac{1}{1+q} \qquad (9)$$

where $$q = \frac{R_{48}}{R_{50}}$$

By inspection of FIG. 2, it will be seen that as the contact 37a is moved in a clockwise direction to increase the current through the slidewire $R_{34e}$, the contact 48a is moving in a direction which decreases the signal $E_f$ to the amplifier 10A. In order for the signal voltage $E_f$ to be the same with the contacts 37a and 48a in their extreme clockwise and counterclockwise positions, the ratio of resistance of $R_{37}$ to the resistance of $R_{34e}$ is made equal to the ratio of the resistance of $R_{48}$ to $R_{50}$. This will now be demonstrated.

Since the voltage $E_4$, for the assumed stationary position of contact 34a and a given input voltage $E_{IN}$, varies with the position of slidewire contact 37a, the value of $\bar{E}_4$ for its extreme clockwise position and its value for the extreme counterclockwise position will not be equal. Hence, these voltages do not cancel out in Equation 9. Regardless of the position of contact 34a and for any degree of unbalance, it can be seen by inspection, $$\frac{E_{2(CW)}}{E_{2(CCW)}} = \frac{E'_{2(CW)}}{E'_{2(CCW)}} = \frac{E_{e0\ CW}}{E_{e(CCW)}} = \frac{E_{4(CW)}}{E_{4(CCW)}} \quad (10)$$

Rewriting claim 9, substituting $E_2$ for $E_4$, as in Equation 10, $$\frac{E_{f(CW)}}{E_{f(CCW)}} = \frac{E_{2(CW)}}{E_{2(CCW)}} \times \frac{1}{1+q} \quad (11)$$

Accordingly, Equation 11 may be rewritten substituting therein the righthand side of Equation 5, $$\frac{E_{f(CW)}}{E_{f(CCW)}} = (1+P) \times \frac{1}{1+q} \quad (12)$$

It is to be noted that the quantity $(1+P)$ is multiplied by the quantity $$\frac{1}{1+q}$$

Equation 12 reveals the fact that the input $E_f$ to the amplifier will be the same for the two extreme positions of the slidewires if the quantity $P$ be made equal to $q$. This is done by adjusting the values of the resistors to satisfy the following equation:

$$\frac{R_{37}}{R_{34e}} = \frac{R_{48}}{R_{50}} \quad (13)$$

It will now be seen that Equation 12 results in the following:

$$\frac{E_{f(CW)}}{E_{f(CCW)}} = \frac{1+1}{1+1} = 1 \quad (14)$$

Equation 14 demonstrates that for the two extreme positions of contacts 37a and 48a respectively clockwise and counterclockwise, the voltage $E_f$ does not change. Its ratio for the two positions is equal to unity.

The above may be summarized by saying that the ratio of $R_{48}$ to $R_{50}$ is made equal to the ratio of $R_{37}$ to $R_{34e}$, so that the attenuating slidewire $R_{48}$ and its equal-valued resistors act to change the voltage $E_4$ inversely with respect to the change in the voltage $E_2$ to maintain $E_f$ constant for the two extreme positions of adjustment of the slidewires.

In order for $E_f$ to remain substantially unchanged for the illustrated intermediate positions of slidewire contacts 37a and 48a, the relationship of the resistance of resistors $R_{36}$ and $R_{47}$ is determined as follows.

By selecting resistors $R_{36}$ and $R_{47}$ such that the product of the two ratios, $R_{36}$ to $R_{34e}$ and $R_{47}$ to $R_{50}$ shall be equal to one-fourth of the ratio of $R_{37}$ to $R_{34e}$ plus 1, the input signal $E_f$ to the detector amplifier 10A will be the same at the mid-position as for the extreme positions.

Mathematically, $$\frac{R_{36}}{R_{34e}} \times \frac{R_{47}}{R_{50}} = \frac{1}{4}\left(1 + \frac{R_{37}}{R_{34e}}\right) = \frac{1}{4}\left(1 + \frac{R_{48}}{R_{50}}\right) \quad (15)$$

By selecting resistors $R_{36}$ and $R_{47}$ such that their product in ohms is equal to ¼ of the sum of the ratio of unity and the shunting slidewire $R_{37}$ divided by the equivalent resistance of the measuring slidewire $R_{34e}$, then the input signal $E_f$ to the detector-amplifier 10A will be the same at the mid-position as at the extreme positions.

If $$m = \frac{R_{36}}{R_{34e}} \text{ and } n = \frac{R_{47}}{R_{50}}$$

then:

$$mn = \tfrac{1}{4}(P+1) = \tfrac{1}{4}(q+1) \quad (16)$$

With the input signal $E_f$ to amplifier 10A the same for the extreme positions and for the center position, it will be understood that for the intermediate positions the signal $E_f$ will be approximately the same for all positions of the contacts 37a and 48a of slidewires R37 and R48. There have now been developed the applicable equations by means of which all resistance values may be selected, to achieve a system where the overall gain or sensitivity of the detector-amplifier of FIG. 1 will be to a close approximation the same for the setting of the span-control $R_{37}$ at its two end positions and at its center position. Those skilled in the art will understand how to select the values of the needed resistors for the circuit of FIG. 1, more than one solution being possible. In one satisfactory arrangement, values were utilized for the resistors which provided the following ratios:

$P = q = 2$ (for a span voltage ratio of 3 to 1)
$m = \tfrac{1}{4}$
$n = 3$

Transformed into resistance values, the foregoing ratios establish the following:

| | Ohms |
|---|---|
| $R_{38} = R_{34e}$ | 100 |
| $R_{37}$ | 200 |
| $R_{36}$ | 25 |
| $R_{49} = R_{50}$ | 4000 |
| $R_{48}$ | 8000 |
| $R_{47}$ | 12000 |

With the foregoing selections of the ratios, the overall gain for all settings of span slidewire $R_{34e}$ was flat to within plus or minus 0.125%, a uniformity of gain adequate for nearly all commercial applications of the measuring system.

If it be desired to measure with high precision for purposes of either or both control and monitoring of temperatures varying between, say 1200° and 1250° F., the span-control including slidewire contact 37a will be set by knob 52 until the associated pointer reads 50° F. on its scale 52a. The zero-suppression circuit 32 will then be set to suppress the zero to 1200° F. Thereafter, the system will measure the range of from 1200° F. to 1250° F. with maximum precision.

The zero-suppressing circuit 32 includes a regulated source of supply 60. Any conventional constant voltage source may be utilized such as the one available on the market as part No. 099012 of Leeds and Northrup Company and described in its Data Sheet No. NY2 (2) (1160). It is desirable that the output from the source 60 should be maintained at the same value plus or minus five-hundredths of a percent. The source of supply energizes three branch circuits, the first including a resistor R–1 in series with a plurality of resistors R–2—R–6, as a group shunted by a resistor R–7. The values of the resistors are selected to provide four steps each of ten millivolts magnitude.

The third branch circuit includes series resistor R–10 together with nine additional series resistors R–11—R–19, as a group shunted by resistor R–20. These resistors have tapped connections to provide nine steps, each of 1 millivolt magnitude. By use of associated movable switch contacts 61 and 62, there may be selected output voltages in steps of 1 millivolt up to 49 millivolts, it being understood that the resistor R–22 in series in the first branch circuit and the resistor R–23 in series in the third branch circuit will have values consistent with the derivation of the step voltages just described.

The second branch circuit provides vernier modification of each output voltage over the range from zero to 1 millivolt. This circuit includes a current-adjusting variable resistor R–8 and a series resistor R–9 connected to the adjustable contact 63a of a slidewire R–21, the respective ends of which are connected at points 64 and 65 to the first and third branch circuits. These junction points respectively lie between resistors R–22 and R–23 and the voltage-developing resistors associated with contacts 61 and 62.

The contacts 61 and 62 have been illustrated in their zero positions. Accordingly, the measuring system, including the detector-amplifier 10, will operate for a range of from zero millivolts output from thermocouple 30 to the maximum range which will have been established by the span-control system 31. If zero-suppression of less than a millivolt be desired, use is made of the second branch circuit which includes a number of important provisions. First, the resistor R-9 is made relatively large, over 15,000 ohms, so that the current $I_9$ during the second branch circuit will remain relatively constant for all positions of contact 63a on slidewire R-21.

The effect of moving the contact 63a on slidewire R-21 is to shift or change the division of the current $I_9$ as between resistor R-22 in the first branch circuit and the resistor R-23 in the third branch circuit. It is in this manner that the output voltage may be varied through the range of from zero to 1 millivolt, it being understood that the resistor R-8 will be adjusted for calibration of the second branch to achieve this selected range.

In one embodiment of the invention, the resistance values for the third branch of the circuit were selected so that the voltage developed between the zero contact, and the No. 9 contact of selector switch 62 was equal to 9 millivolts, this voltage, of course, also appearing across the shunting resistor R-20. The values of resistance in the first branch were selected so that there was developed across the resistor R-6 9.5 millivolts. By reason of the difference between these two voltages of one-half millivolt, it will be seen that with the contact 63 in its mid-position for equal division of its current between equal-valued resistors R-22 and R-23, there will be an output voltage of said one-half millivolt.

The foregoing arrangement is advantageous since a scale 63 may be calibrated from zero to 1 millivolt as from the right-hand side of the scale to the left-hand side instead of utilizing a scale somewhat more difficult to use with the zero at the mid-point. It is to be understood that in some applications a zero-center scale may be preferred, and as already indicated, with voltage values for the steps in the third branch greater or less than those shown, the range of voltage adjustment by slidewire R-21 can be changed as desired.

As further illustrative of a typical embodiment of the zero-suppressing circuit, there is provided the following tabulation of resistance values:

| Resistor: | Ohms |
|---|---|
| R-1 | 873.51 |
| R-2—R-5 | 5 |
| R-6 | 4.75 |
| R-7 | 17.2715 |
| R-8 | [1] 500 |
| R-9 | 15,826.0 |
| R-10 | 881.83 |
| R-11—R-19 | 5 |
| R-20 | 1.92885 |
| R-21 | [1] 200 |
| R-22 | 2.0 |
| R-23 | 2.0 |

[1] ±10%.

There are additional advantages to the zero-suppressing system 32. The contacts 61 and 62 of the respective stepping switches carry no current for the reason that the detector-amplifier 10 operates with sufficient speed effectively to maintain the output voltage $E_f$ of the network 31 essentially at zero, which means that any current flow in the circuit, including thermocouple 30, takes place only during change in the magnitude of the condition. This operation insofar as the system 32 is concerned, differs from voltage-dividers of the Kelvin-Varley type since such voltage-dividers utilize dual switching contacts which concurrently move to bridge different pairs of resistors from which selected voltages from such resistors are derived by reason of current flow through the selector contacts.

Since single-pole switches 61 and 62 are used in the zero-suppressing system 32, they will be of similar or like construction. Thus, any thermal E.M.F. which may be developed at contact 61 will not only be low, but it will tend to be cancelled out by any thermal E.M.F. which may be developed at the contact 62.

In the Kelvin-Varley voltage-divider, the vernier slide-wire is connected in series in the output circuit, and, hence, is used to add to or subtract the output voltage. For this reason, it must be calibrated in terms of voltage output. In the zero-suppressing system 32, the vernier slidewire R-21 does not have to be voltage-calibrated. So long as it is linear, the value of current $I_9$ is simply adjusted to a selected value and the shift of current as between resistors R-22 and R-23 produces the desired change in output voltage. In this connection, the effect of contact resistance as between contact 63 and slidewire R-21 is minimized by the provision of the high-valued resistor R-9.

From what has been described above, it will now be clear to those skilled in the art that the contact 61 may be moved to any one of the selected positions given in millivolts, and, further, that additional steps may be provided for any given application. Similarly, the number of steps in the third branch circuit may be increased or decreased as desired, it being emphasized again that the current-shifting resistor or slidewire R-21 will preferably be effective to provide a vernier adjustment equal to each step selected by contact 62 of the third branch.

It is to be further understood that the span or range-adjusting system 31 has utility and advantages for performing its sole function of span-control and that the zero-adjusting system 32 likewise has utility as a voltage-divider, and this notwithstanding the fact that the two systems 31 and 32 do provide a measuring system of improved reliability, greater precision, and versatility adequate to meet a multiplicity of measuring requirements. It is particularly advantageous in the speed with which selections may be made to adapt the instrument to changing requirements imposed by the measured variable as can readily occur in multiple-point systems where different thermocouples are substituted one after the other in place of the thermocouple 30, each different thermocouple being subjected to different temperature ranges.

Now that there has been described preferred embodiments of the invention, it will be understood that modifications may be made therein within the scope of the appended claims and that some feature may be utilized in the absence of other features of the invention, such for example, as the inclusion or exclusion of the zero-suppressing network. In this connection, the phrase "zero-suppression" has been used in the description to mean a selecting system which introduces a voltage into the measuring circuit for the purpose of establishing what the "zero" on the scale 23 shall represent. Thus for some measuring systems, the zero on the scale of the instrument can correspond with one selected temperature and for another measuring problem that zero will correspond to a wholly different temperature. In some applications, the zero on the scale will require the introduction into the measuring circuit of a voltage of one polarity and in other cases, the introduction of a voltage of an opposite polarity, these also having been referred to as zero-suppression in a limited sense and zero elevation for the voltage of opposite polarity. While a polarity has been indicated on the adjustable power supply 60 as well as upon the output taps 61 and 62, it will be understood that this has been done to simplify the description and that the conductors 66 and 67 may be interchanged in their connection to contacts 61 and 62 for reversal of polarity where needed.

What is claimed is:
1. A measuring system comprising
   a detector-amplifier, an attenuating slidewire for said detector-amplifier including a contact,
a resistor in series with said contact of said attenuating slidewire,
said attenuating slidewire having two leg connections each including equal-valued resistors, one of them being connected across an input circuit of said detector-amplifier for applying to it a selected fraction of an error signal,
an adjustable current shunt comprising a shunting slidewire having two leg connections, one including a resistor and the other including a measuring slidewire, the resistance of said first-mentioned leg connection being equal to the equivalent resistance of the other said leg connection for providing a maximum ratio of the change in voltage across said measuring slidewire equal to the sum of the resistance of said shunting slidewire plus the equivalent resistance of one of said leg connections divided by said last-mentioned resistance,
a source of current,
a resistor in series therewith,
connections for connecting said source of current and said series resistor in series-circuit relation with said adjustable contact of said shunting slidewire and the juncture of its leg connections, adjustment of said shunting slidewire varying the current through said measuring slidewire,
an input circuit for application thereto of a voltage, the magnitude of which is to be measured, including a connection to said measuring slidewire and to said attenuating slidewire by way of said resistor connected in series with the contact of said attenuating slidewire, the difference between said voltage the magnitude of which is to be measured and that from said measuring slidewire producing an error voltage, a fractional part of which is applied to said detector-amplifier by said equal-valued resistor connected across the input circuit of said detector-amplifier, and
mechanical means for adjusting said shunting slidewire to vary the current through said measuring slidewire and concurrently adjusting said attenuating slidewire to maintain substantially constant said fraction of said error signal applied to said detector-amplifier independently of the level of current flowing through said measuring slidewire.

2. The measuring system of claim 1, in which the product of the ratios of said series resistor of said current shunt to the resistance of said measuring slidewire and the resistance of said other series resistor to the resistance of said resistor connected across the input of said detector-amplifier is equal to ¼ of the sum of unity and the ratio of the resistance of said shunting slidewire to the resistance of said measuring slidewire for maintaining substantially constant the input signal $E_f$ applied to said detector-amplifier for all positions of said shunting slidewire and said attenuating slidewire.

3. In a measuring system having an input circuit for application thereto of a voltage, the magnitude of which is to be measured,
a potentiometer having an adjustable measuring slidewire connected in said input circuit for developing therein a balancing voltage in opposition to said voltage to be measured and of magnitude variable by adjustment of said slidewire,
a detector-amplifier connected to said input circuit responsive to an error signal proportional to the difference between said voltages, and
means responsive to said detector-amplifier for adjusting said slidewire in a direction to change the magnitude of said balancing voltage in a direction to decrease the difference between said voltage to be measured and said balancing voltage, the combination of
an adjustable current shunt comprising a shunting slidewire having two leg connections, one including a resistor and the other including said measuring slidewire, the resistance of said first-mentioned leg connection being equal to the equivalent resistance of the other said leg connection for providing a maximum ratio of the change in voltage across said measuring slidewire equal to the sum of the resistance of said shunting slidewire plus the equivalent resistance of one of said leg connections divided by said last-mentioned resistance,
a source of current,
a resistor in series therewith,
connections for connecting said source of current and said series resistor in series-circuit relation with said adjustable contact of said shunting slidewire and to the juncture of its leg connections,
an attenuator for said detector-amplifier including an attenuating slidewire having a contact,
a resistor in series with said contact of said attenuating slidewire,
said attenuating slidewire having two leg connections each including equal-valued resistors, one of them being connected across the input circuit of said detector-amplifier for applying to said detector-amplifier a selected fraction of said error signal, and
mechanical means for adjusting said shunting slidewire to vary the current through said measuring slidewire and concurrently adjusting said attenuating slidewire to maintain substantially constant said fraction of said error signal applied to said detector-amplifier independently of the level of current flowing through said measuring slidewire.

4. In a measuring system having an input circuit for application thereto of a voltage, the magnitude of which is to be measured,
a potentiometer having an adjustable measuring slidewire connected in said input circuit for develping therein a balancing voltage in opposition to said voltage to be measured and of magnitude variable by adjustment of said slidewire,
a voltage indicating means including a scale, a detector-amplifier connected to said input circuit responsive to an error signal proportional to the difference between said voltages, and means responsive to said detector-amplifier for adjusting said slidewire in a direction to change the magnitude of said balancing voltage in a direction to decrease the difference between said voltage to be measured and said balancing voltage,
the combination of a selecting system for establishing what zero on said scale of said detector-amplifier shall represent, said selecting system having an output voltage,
means for connecting the output voltage of said selecting system in series with said voltage, the magnitude of which is to be measured,
said selecting system comprising
a power source,
three branch circuits connected across said source, two of said branch circuits each including a plurality of tapped resistors for developing predetermined voltages, by steps, from the respective taps thereto, and
single-pole selector switches, one for the tapped resistors of each of said two branches,
said third branch including a current-adjusting resistor, a high-valued resistor in series therewith, and a current-shifting slidewire having a contact relatively adjustable therewith connected in series with said high-valued resistor, the ends of said last-named slidewire being respectively connected to said two branches, each of said two branches having between said power source and said connection from the respective ends of said slidewire equal-valued resistors,
said current-shifting slidewire in said third branch upon adjustment relative to its contact shifting the current from one to the other of said two branches for modifying said output voltage through a range at least equal to the minimum voltage step developed by said tapped resistors.

5. In a measuring system having an input circuit for application thereto of a voltage, the magnitude of which is to be measured,
- a potentiometer having an adjustable measuring slidewire connected in said input circuit for developing therein a balancing voltage in opposition to said voltage to be measured and of magnitude variable by adjustment of said slidewire,
- voltage-indicating means including a scale and a detector-amplifier connected to said input circuit responsive to an error signal proportional to the difference between said voltages for producing an indication on said scale of the magnitude of said voltage to be measured,
- means responsive to said detector-amplifier for adjusting said slidewire in a direction to change the magnitude of said balancing voltage in a direction to decrease the difference between said voltage to be measured and said balancing voltage, the combination of
- an adjustable current shunt comprising a shunting slidewire having two leg connections, one including a resistor and the other including said measuring slideware, the resistance of said first-mentioned leg connection being equal to the equivalent resistance of the other said leg connection for providing a maximum ratio of the change in voltage across said measuring slidewire equal to the sum of the resistance of said shunting slidewire plus the equivalent resistance of one of said leg connections divided by said last-mentioned resistance,
- a source of current,
- a resistor in series therewith,
- connections for connecting said source of current and and said series resistor in series-circuit relation with said adjustable contact of said shunting slidewire and to the juncture of its leg connections,
- an attenuator for said detector-amplifier including an attenuating slidewire having a contact,
- a resistor in series with said contact of said attenuating slidewire,
- said attenuating slidewire having two leg connections each including equal-valued resistors, one of them being connected across the input circuit of said detector-amplifier for applying to said detector-amplifier a selected fraction of said error signal,
- mechanical means for adjusting said shunting slidewire to vary the current through said measuring slidewire and concurrently adjusting said attenuating slidewire to maintain substantially constant said fraction of said error signal applied to said detector-amplifier independently of the level of current flowing through said measuring slidewire.
- a selecting system for establishing what zero on said scale of said voltage-indicating means shall represent, said selecting system having an output voltage,
- means for connecting the output voltage of said selecting system in series with said voltage, the magnitude of which is to be measured,
- said selecting system comprising
- a power source,
- three branch circuits connected across said source, two of said branch circuits each including a plurality of tapped resistors for developing predetermined voltages, by steps, from the respective taps thereto, and single-pole selector switches, one for the tapped resistors of each of said two branches,
- said third branch including a current-adjusting resistor, a high-valued resistor in series therewith, and a current-shifting slidewire having a contact relatively adjustable therewith connected in series with said high-valued resistor, the ends of said last-named slidewire being respectively connected to said two branches, each of said two branches having between said power source and said connection from the respective ends of said slidewire equal-valued resistors,
- said current-shifting slidewire in said third branch upon adjustment relative to its contact shifting the current from one to the other of said two branches for modifying said output voltage through a range at least equal to the minimum voltage step developed by said tapped resistors.

6. In a measuring system having an input circuit for application thereto of a voltage, the magnitude of which is to be measured,
- a potentiometer having an adjustable measuring slidewire connected in said input circuit for developing therein a balancing voltage in opposition to said voltage to be measured and of magnitude variable by adjustment of said slidewire,
- a detector-amplifier connected to said input circuit responsive to an error signal proportional to the difference between said voltages,
- means responsive to said detector-amplifier for adjusting said slidewire in a direction to change the magnitude of said balancing voltage in a direction to decrease the difference between said voltage to be measured and said balancing voltage, the combination of,
- an adjustable current shunt comprising a shunting slidewire having two leg connections, one including a resistor and the other including said measuring slidewire, the resistance of said first-mentioned leg connection being equal to the equivalent resistance of the other said leg connection for providing a maximum ratio of the change in voltage across said measuring slidewire equal to the sum of the resistance of said shunting slidewire plus the equivalent resistance of one of said leg connections divided by said last-mentioned resistance,
- a source of current,
- a resistor in series therewith,
- connections for connecting said source of current and said series resistor in series-circuit relation with an adjustable contact of said shunting slidewire and to the juncture of its leg connections,
- an attenuator for said detector-amplifier including an attenuating slidewire having a contact,
- a resistor in series with said contact of said attenuating slidewire,
- said attenuating slidewire having two leg connections each including equal-valued resistors, one of them being connected across the input circuit of said detector-amplifier for applying to said detector-amplifer a selected fraction of said error signal,
- the resistance of said shunting slidewire divided by the resistance of said measuring slidewire providing a ratio equal to the ratio of the resistance of said attenuating slidewire divided by the resistance of said resistor connected across the input circuit of said detector-amplifier, and
- mechanical means for adjusting said shunting slidewire to vary the current through said measuring slidewire and concurrently adjusting said attenuating slidewire to maintain substantially constant said fraction of said error signal applied to said detector-amplifier independently of the level of current flowing through said measuring slidewire.

No references cited.

WALTER L. CARLSON, *Primary Examiner.*

J. MULROONEY, *Assistant Examiner.*